(12) United States Patent
Jeschke et al.

(10) Patent No.: US 9,786,166 B2
(45) Date of Patent: Oct. 10, 2017

(54) METHOD AND CONTROL AND DETECTION UNIT FOR CHECKING THE PLAUSIBILITY OF A WRONG-WAY DRIVING INCIDENT OF A MOTOR VEHICLE

(71) Applicant: Robert Bosch GmbH, Stuttgart (DE)

(72) Inventors: Christian Jeschke, Beilstein (DE);
Christian Braeuchle, Yokohama (JP);
Simon Geisler, Beilstein (DE)

(73) Assignee: Robert Bosch GMBH, Stuttgart (DE)

( * ) Notice: Subject to any disclaimer, the term of this patent is extended or adjusted under 35 U.S.C. 154(b) by 0 days.

(21) Appl. No.: 14/915,869

(22) PCT Filed: Sep. 1, 2014

(86) PCT No.: PCT/EP2014/068460
§ 371 (c)(1),
(2) Date: Mar. 1, 2016

(87) PCT Pub. No.: WO2015/032704
PCT Pub. Date: Mar. 12, 2015

(65) Prior Publication Data
US 2016/0217688 A1    Jul. 28, 2016

(30) Foreign Application Priority Data

Sep. 6, 2013 (DE) .......... 10 2013 217 833
Nov. 15, 2013 (DE) .......... 10 2013 223 397
May 8, 2014 (DE) .......... 10 2014 208 617

(51) Int. Cl.
*G08G 1/09* (2006.01)
*G08G 1/056* (2006.01)
(Continued)

(52) U.S. Cl.
CPC .......... *G08G 1/056* (2013.01); *G06K 9/00798* (2013.01); *G06K 9/00818* (2013.01); *G08G 1/09623* (2013.01); *G08G 1/166* (2013.01)

(58) Field of Classification Search
CPC ...... G08G 1/056; G08G 1/16; G08B 21/0476; G06K 9/00791
(Continued)

(56) References Cited

U.S. PATENT DOCUMENTS 8,428,861 B1 * 4/2013 Williams .............. G08G 1/164
701/301
2003/0112132 A1 * 6/2003 Trajkovic .............. B60K 35/00
340/435

(Continued)

FOREIGN PATENT DOCUMENTS

DE     199 34 774      2/2001
DE    10 2007 048842   9/2008
(Continued)

OTHER PUBLICATIONS

International Search Report for PCT/EP2014/068460, dated Feb. 6, 2014.

*Primary Examiner* — Phung Nguyen
(74) *Attorney, Agent, or Firm* — Norton Rose Fulbright US LLP; Gerard Messina

(57) ABSTRACT

In a method for checking the plausibility of a wrong-way driving of a motor vehicle when entering a unidirectional roadway, a traversing of a stop line or a solid line of a junction of the unidirectional roadway is detected and/or at least one item of directional information of a roadway of the junction, which is located ahead of the motor vehicle, is collected, and a probability of a wrong-way driving is (Continued)

ascertained based on the detection. The method is performed by a control and detection unit for checking the plausibility of a wrong-way driving.

11 Claims, 8 Drawing Sheets

(51) Int. Cl.
  *G06K 9/00* (2006.01)
  *G08G 1/0962* (2006.01)
  *G08G 1/16* (2006.01)

(58) Field of Classification Search
  USPC .......................... 340/905, 935, 937; 382/104
  See application file for complete search history.

(56) References Cited

U.S. PATENT DOCUMENTS

2011/0121992 A1* 5/2011 Konaka ................ B62D 15/029
  340/905
2014/0354454 A1* 12/2014 Nordbruch ............. G08G 1/056
  340/935

FOREIGN PATENT DOCUMENTS

| | | |
|---|---|---|
| DE | 10 2011 082600 | 3/2013 |
| EP | 1 327 968 | 7/2003 |
| EP | 2 164 057 | 3/2010 |
| JP | 2008181328 A | 8/2008 |
| JP | 2009250965 A | 10/2009 |
| JP | 2012038024 A | 2/2012 |

\* cited by examiner

METHOD AND CONTROL AND DETECTION UNIT FOR CHECKING THE PLAUSIBILITY OF A WRONG-WAY DRIVING INCIDENT OF A MOTOR VEHICLE

BACKGROUND OF THE INVENTION

1. Field of the Invention

The present invention relates to a method and a control and detection device for checking the plausibility of a wrong-way driving incident of a motor vehicle when entering a unidirectional roadway.

2. Description of the Related Art

Wrong-way drivers, also referred to as "ghost drivers," cause deaths, injuries, and significant property damage in the event of an accident. A wrong-way driving incident is understood here to mean driving against the compulsory direction of traffic on a unidirectional roadway. A unidirectional roadway is a roadway that is structurally separated from oncoming traffic. Unidirectional roadways are found on expressways or thruways, such as upgraded federal highways. Wrong-way driving incidents may be divided into forward travel and reverse travel, forward travel being initiated by wrongly entering an off-ramp or by turning.

Over one-half of wrong-way driving incidents start at junctions of expressways. In particular, wrong-way driving incidents on expressways, cause accidents due to the high vehicle speeds, and thus the high collision speeds, frequently with fatal consequences.

Recognizing wrong-way driving incidents via navigation devices is not always reliably possible, since the information of the navigation device, such as road class and direction, is provided too late for most cases of wrong-way driving incidents; i.e., the vehicles are then already in the driving path against the direction of traffic.

Modern motor vehicles use inertial sensors, such as acceleration and yaw rate sensors, and the steering angle to determine the vehicle status, to implement safety and comfort systems. In addition, a variety of motor vehicles presently have an internal GPS module, for example, for a navigation system or a position determination of the motor vehicle. Now and in the future, more and more vehicles are being equipped with video sensors, which also process and output different items of information.

BRIEF SUMMARY OF THE INVENTION

The method according to the present invention for checking the plausibility of a wrong-way driving incident of a motor vehicle when entering a unidirectional roadway fundamentally includes the following steps:
 detecting a traversing of a stop line or a solid line of a junction of the unidirectional roadway; and/or
 collecting at least one item of directional information of a roadway of the junction located ahead of the motor vehicle; and
 ascertaining a probability of a wrong-way driving incident based on the detection.

The method according to the present invention very advantageously enables the detection of an event chain, which enables a plausibility check, i.e., a check or preliminary check, as a preparation or component of a detection or recognition of a wrong-way driving incident. The method according to the present invention may also be viewed and used as the detection of a wrong-way driving incident. The safety is improved by collecting surroundings data, which increases the reliability and robustness of the method. The present invention may thus securely recognize unintentional wrong-way driving incidents as they occur and increase the general traffic safety.

The present invention intentionally considers the wrong-way driving behavior of a motor vehicle or a motor vehicle driver when entering a roadway or at a junction, because most wrong-way driving incidents occur there. Thus, the wrong-way driving incident may advantageously be checked for plausibility and/or detected according to the present invention already before entering the actual road.

In addition to the mentioned detection steps or procedures, further detections may be incorporated. A wrong-way driving incident is checked for plausibility or provided with a probability based on the detections. This may include a comparison of the collected items of information to plausibility check values and a subsequent evaluation. The probability may then be determined or calculated from the individual evaluations. Each individual detection may be considered as a plausibility check criterion, which is then used for the ascertainment of the probability.

The individual steps of the method may run completely in the motor vehicle, in an external unit, such as a central server, or in parallel or distributed to both systems. The execution of the steps is not linked to the mentioned sequence.

In one special specific embodiment, the directional information includes direction-dependent roadway markings and/or direction-dependent traffic signs. Each individual item of information separately or in combination may be used as the foundation for this detection. A multiple of these items of information or plausibility check criteria are advantageously collected. This increases the robustness and safety of the method, since it may resort to a broader base.

Turning from the roadway of the junction to the unidirectional roadway may be detected. This criterion, which is detected relatively rapidly, may be used as a further criterion for the plausibility check. The plausibility check criteria may be considered independently of one another, to a certain extent in parallel, or in the possible or probable sequence thereof, as in an event chain. The safety and reliability of the method may be increased in both ways. This criterion may be detected with the aid of sensors, for example, a video sensor system, or a navigation device or module.

According to one preferred specific embodiment of the present invention, it is provided that the collection of items of information is carried out from video data, navigation data, and/or data of an inertial sensor system of the motor vehicle, or at least one sensor of the motor vehicle is used for the collection. Since most motor vehicles presently have various sensors installed, these sensors or their signals may easily be used for the method. The signals may be used directly or indirectly, for example, processed, or as a basis for derived variables or values. For example, image sensors, including cameras or video cameras, radar sensors, acceleration sensors, wheel sensors, steering angle sensors, GPS devices, or also navigation devices or computer or control units which process these and other data may be used as sensors. The use of two sensor types is particularly advantageous, for example, a navigation module and a video sensor, since the two types supplement one another. This increases the safety and robustness of the method.

Furthermore, the ascertainment, determination, and/or the plausibility check may be carried out in a unit external to the motor vehicle. An external unit, such as a server, for example, of the vehicle manufacturer, may be used as a replacement or backup system. It may also be provided that the method is only run in the external unit, for example, if the motor vehicle does not have the required sensors, the map material, or a part thereof. The communication between the external unit and the server may be established via a mobile radio channel.

During the drive on the unidirectional roadway, an initiation and/or a procedure of a turning maneuver may be detected. The drive on the unidirectional roadway may be a first plausibility check criterion, the initiation may be a second plausibility check criterion, and the actual procedure may be a further plausibility check criterion. This graduated observation increases the safety of the method.

It is advantageously provided that each collection procedure detects one plausibility check criterion, and each plausibility check criterion is associated with a percentage for the ascertainment of the probability of a wrong-way driving incident. Then, by simply adding the percentages, which may be independent of one another or may be provided with a conditional weighting, the probability of a wrong-way driving incident may be determined rapidly and safely. The robustness and reliability of the method and therefore the safety of vehicle and occupants may thus be increased.

It is also possible that a wrong-way driving incident is determined or detected based on the probability. This may take place in that a preset limiting value, which is also adaptable, for the probability or the percentage is exceeded.

According to the present invention, a control and detection device is provided for checking the plausibility of a wrong-way driving incident of a motor vehicle when entering a unidirectional roadway, having means for detecting a traversing of a stop line or a solid line of a junction of the unidirectional roadway, and/or means for collecting at least one item of directional information of a roadway of the junction, which is located ahead of the motor vehicle, and means for ascertaining a probability of a wrong-way driving incident based on the collection. The same advantages and modifications as described above apply.

The means for detecting may have at least one optical sensor, preferably a video sensor system, a navigation system, and/or an inertial sensor. These components are simple to integrate and allow a rapid and safe detection. The means for ascertaining may include a controller or a control unit or a suitable processing unit.

The steps of detecting or the plausibility check criteria include the following group: detecting a traversing of a stop line or a solid line of a junction of the unidirectional roadway; collecting at least one item of directional information of a roadway of the junction, which is located ahead of the motor vehicle; detecting at least one direction-dependent roadway marking; detecting at least one direction-dependent traffic sign; detecting a turn from the roadway of the junction onto the unidirectional roadway; detecting an initiation of a turning maneuver during the drive on the unidirectional roadway; detecting a procedure of a turning maneuver during the drive on the unidirectional roadway. The method according to the present invention includes at least one, preferably a plurality, of the steps from the mentioned group.

DETAILED DESCRIPTION OF THE INVENTION

Figure 1:
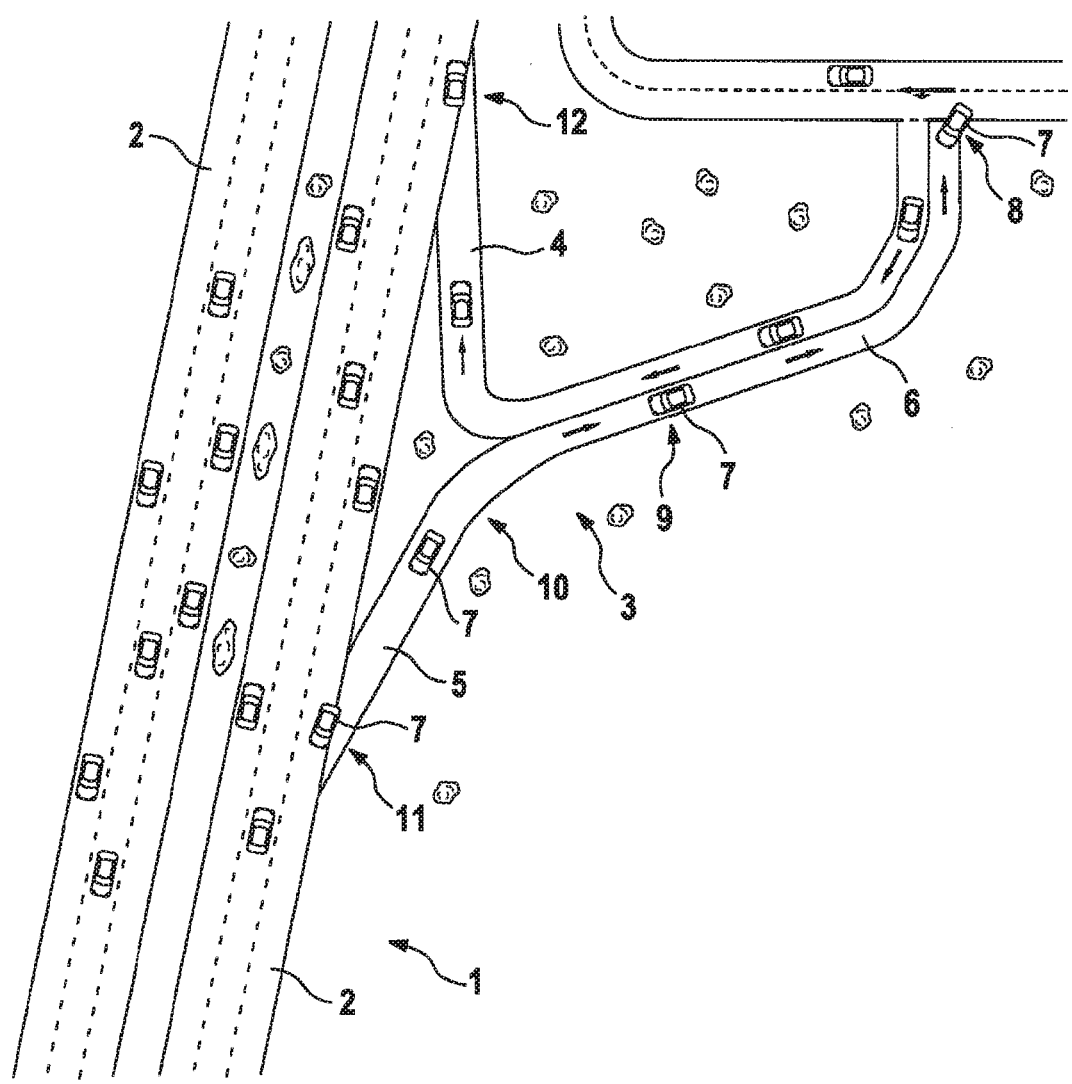
FIG. 1 shows a schematic view of a junction of a unidirectional roadway.

FIG. 1 shows a road or expressway 1 having two unidirectional roadways 2, which are structurally separated from one another, and a junction 3. Junction 3 has an on-ramp 4 and an off-ramp 5. Starting from a shared roadway 6, on-ramp 4 or entry-ramp is used for entering unidirectional roadway 2 of expressway 1, while off-ramp 5 or exit-ramp is used for departing unidirectional roadway 2.

A vehicle driving the wrong-way or wrong-way driver 7 is shown in a first position 8 when approaching or entering junction 3; this situation will be explained in greater detail later on the basis of FIG. 2. Furthermore, motor vehicle 7 is shown in a second position 9 during the drive on an oncoming lane or off-ramp 5; this situation will be explained in greater detail later on the basis of FIG. 3.

In or shortly after a third position 10, motor vehicle 7 is located in the further course of off-ramp 5. This situation will be explained later on the basis of FIG. 4. In a fourth position 11, motor vehicle 7 driving the wrong-way changes from junction 3 or the off-ramp to unidirectional roadway 2, which will be described in greater detail later on the basis of FIG. 5. A fifth position 12 is shown in FIG. 6.

The term vehicle or motor vehicle is understood here to include all driven means of transportation, for example, passenger automobiles, trucks, buses, motorcycles, etc.

Figure 2:
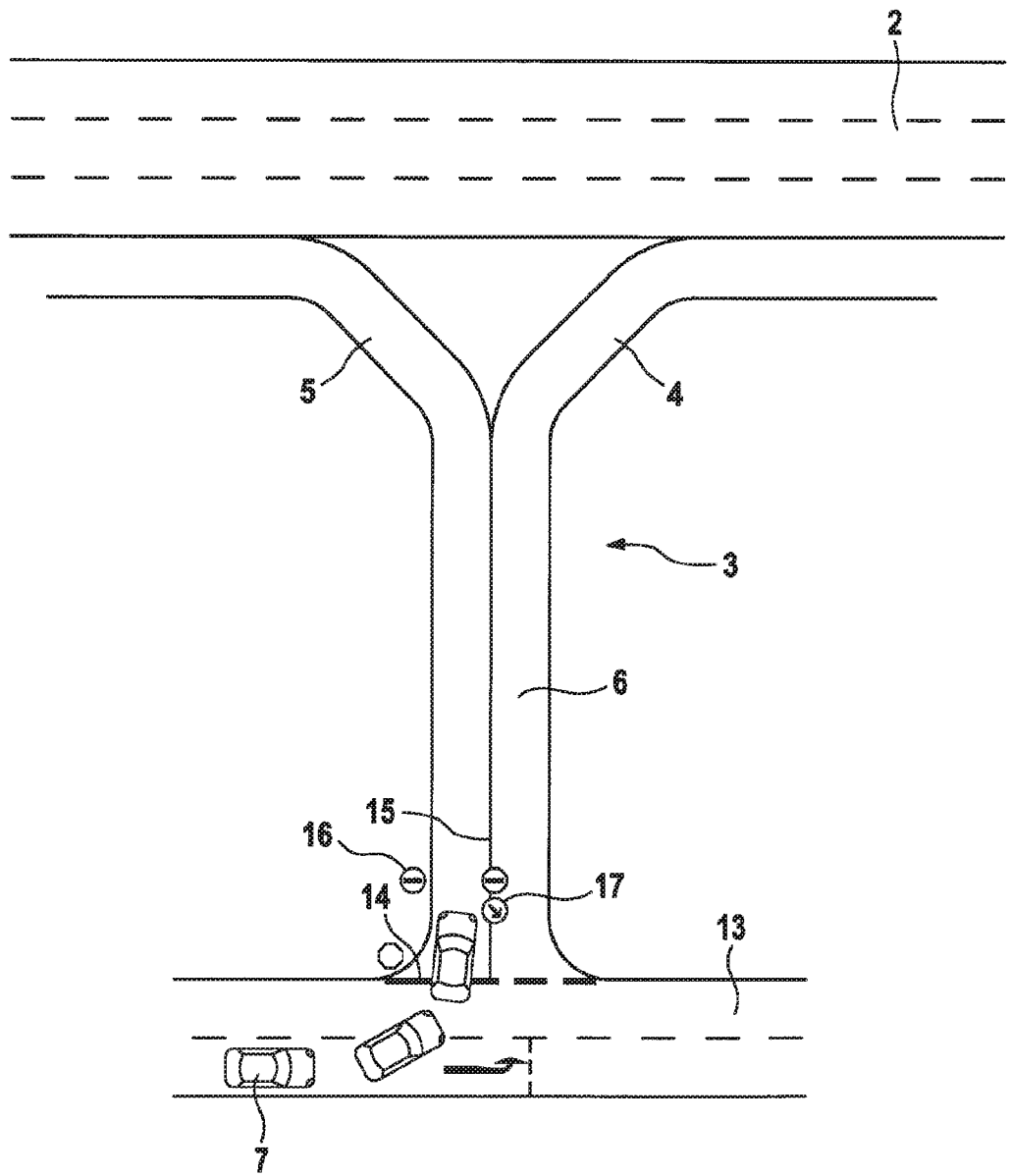
FIG. 2 shows a schematic view of an entry of a motor vehicle into the junction.

FIG. 2 shows the entry of a motor vehicle 7 from an approach road 13 into junction 3. Motor vehicle 7 does not turn correctly into the lane of on-ramp 4, but rather incorrectly into the lane of off-ramp 5. In the process, vehicle 7 driving the wrong-way traverses either a stop line 14 or a solid line 15. Stop line 14 forms the transition for correctly driving vehicles on off-ramp 5 to approach road 13. Solid line 15 separates off-ramp 5 and on-ramp 4 from one another in the area of shared roadway 6.

Two no-entry signs 16 are set up in the area of or behind stop line 14, which prohibit entering off-ramp 5. The signs correspond to sign 267 of the Road Traffic Act (StVO). Furthermore, a direction sign 17 is set up, which prescribes keeping to the right of this sign while driving past. This sign corresponds to sign 222 of the Road Traffic Act.

Figure 3:
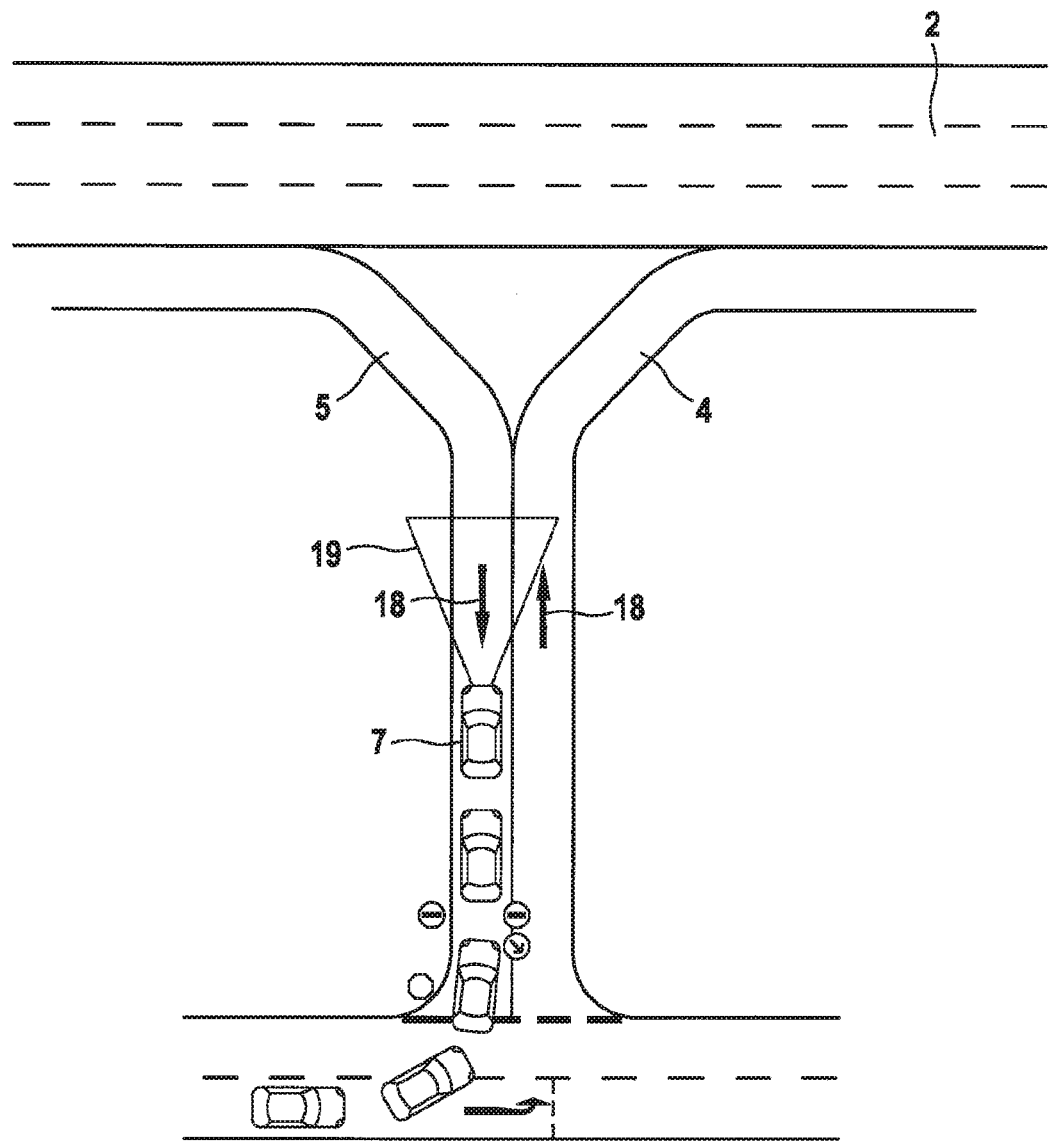
FIG. 3 shows a schematic view of a further drive of the motor vehicle into the junction.

FIG. 3 shows wrong-way vehicle 7 driving further on off-ramp 5. Road markings or roadway markings 18, in the form of directional arrows here, are shown ahead of vehicle 7 in the driving direction. Directional arrow 18 located directly ahead of vehicle 7 points opposite to a driving direction of motor vehicle 7, while directional arrow 18 situated on on-ramp 4 points in the direction of the driving direction of motor vehicle 7.

A detection range 19 of a sensor, for example, a video camera, of motor vehicle 7 is shown. The detection depth, i.e., the length of detection range 19, and/or the detection width, i.e., the angle or the detection cone of detection range 19, are not necessarily shown true to scale.

Figure 4:
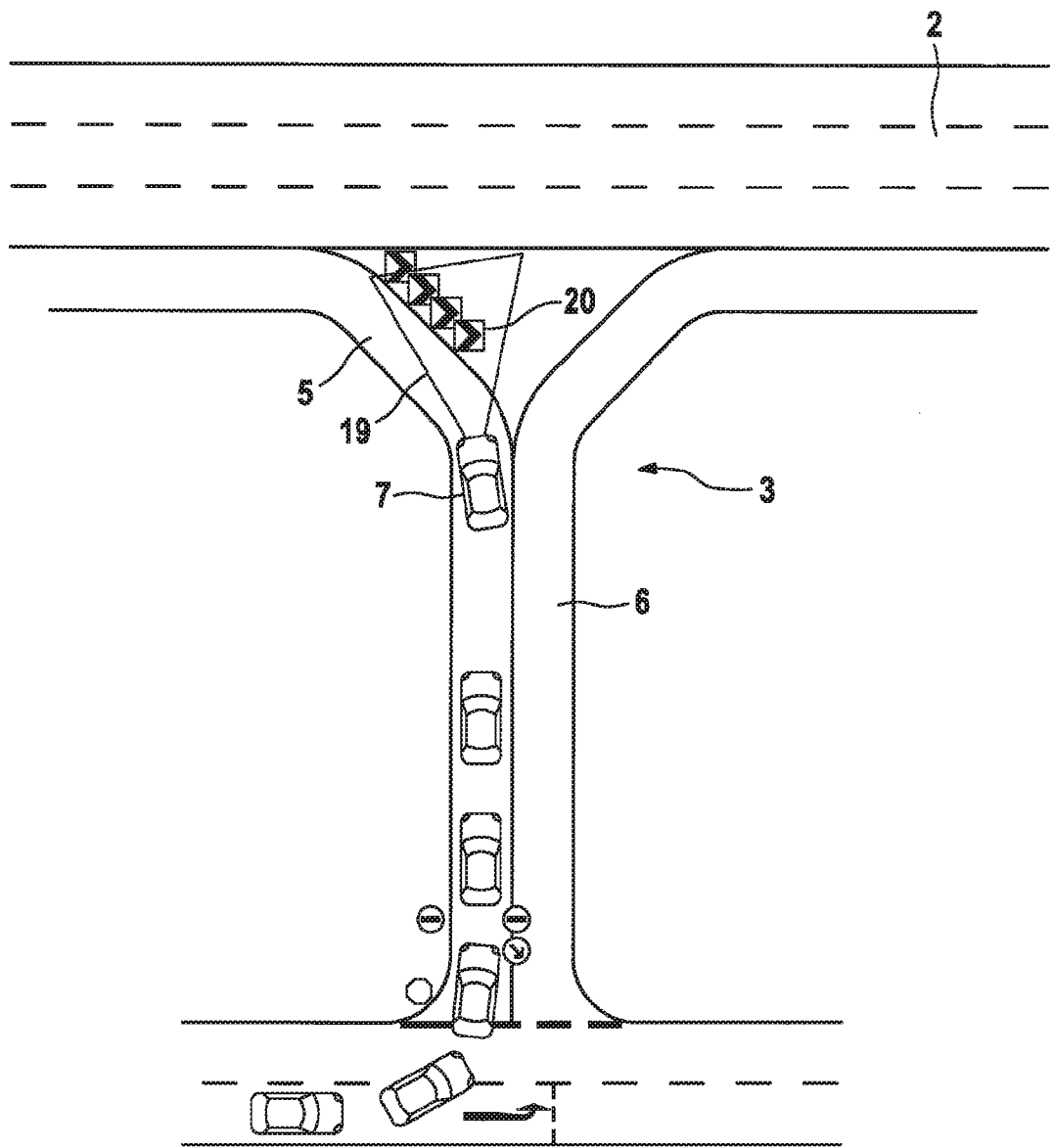
FIG. 4 shows a schematic view of still a further drive of the motor vehicle into the junction

FIG. 4 shows motor vehicle 7 in the further course of driving on off-ramp 5. Motor vehicle 7 is just about to leave shared roadway 6 of junction 3. Multiple direction signs 20 are in detection range 19 of motor vehicle 7 at this time. Direction signs 20 may be direction signs which indicate the correct direction within the meaning of the Road Traffic Act, sign 625-20. Direction signs 20 are used for guiding correctly driving traffic on off-ramp 5. For motor vehicle 7 driving the wrong-way, direction signs 20 contain items of directional information which are oriented opposite to the driving direction or moving direction of vehicle 7 driving the wrong-way.

Figure 5:
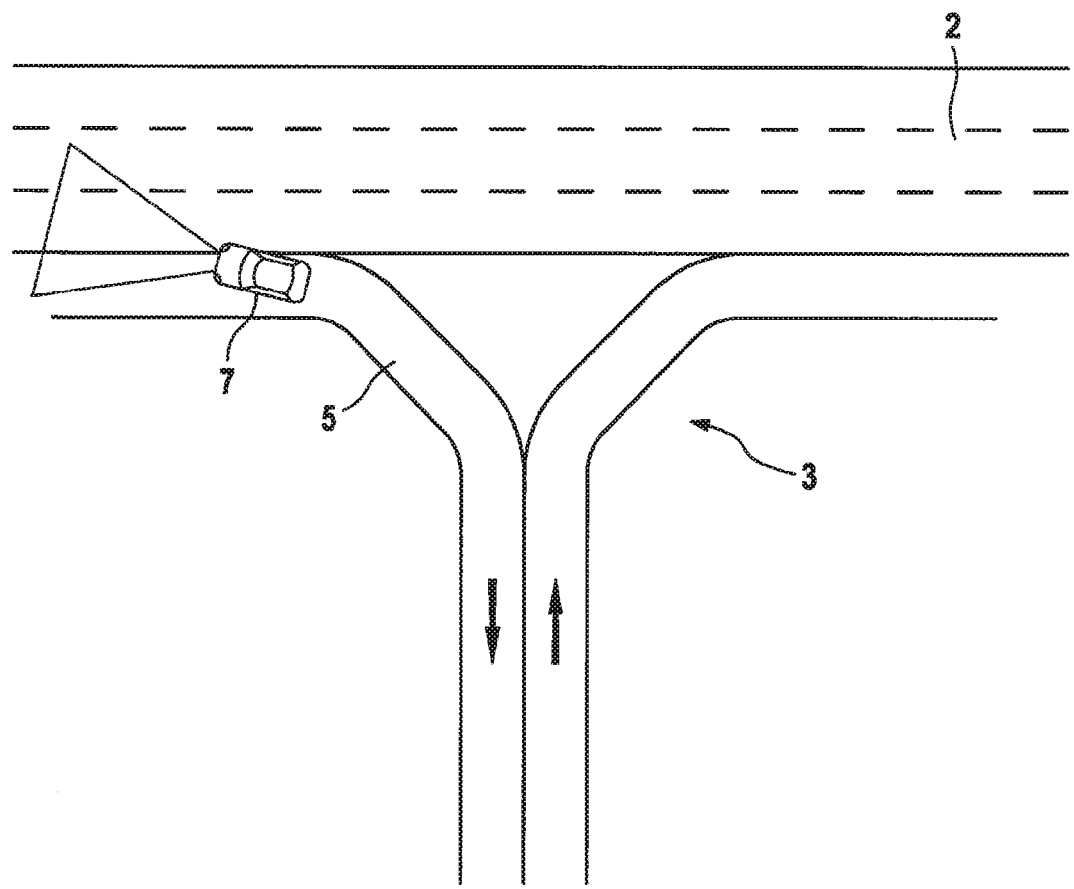
FIG. 5 shows a schematic view of a turn of the motor vehicle from the junction onto the unidirectional roadway.
Figure 6:
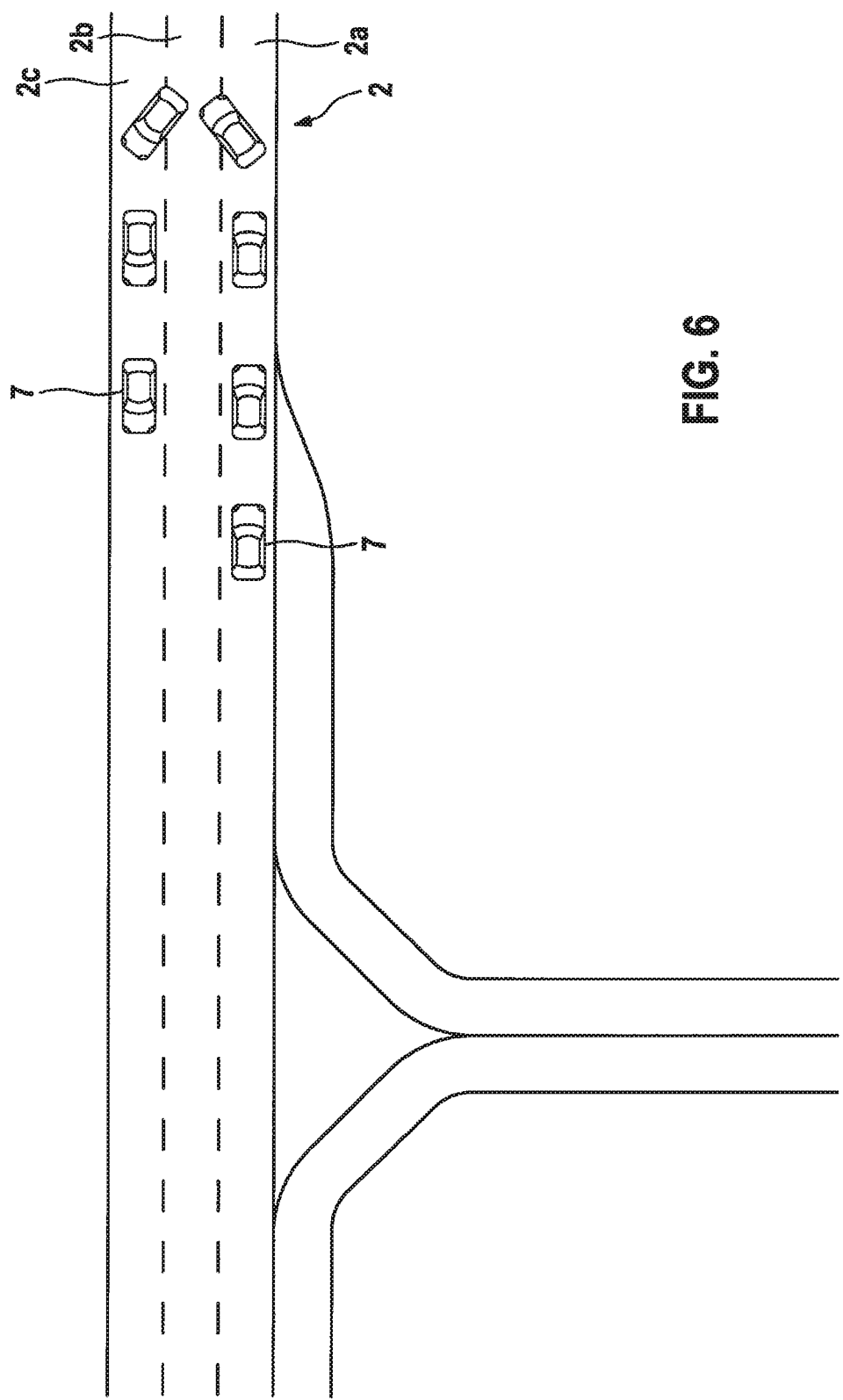
FIG. 6 shows a schematic view of a turning maneuver of a motor vehicle on the unidirectional roadway.

According to the illustration in FIG. 5, motor vehicle 7 changes from off-ramp 5 onto or into unidirectional roadway 2. This change may also be referred to as a turning procedure. Upon departing off-ramp 5 or junction 3, motor vehicle 7 is now located opposite to the direction of traffic on unidirectional roadway 2, which corresponds to a wrong-way driving incident. Driving on off-ramp 5 may already be considered to be a wrong-way driving incident.

FIG. 6 shows an example of a non-permissible turning maneuver of a motor vehicle 7 on unidirectional roadway 2. Motor vehicle 7 initially drives correctly on a right lane 2a of unidirectional roadway 2 and then changes to middle lane 2b, which still corresponds to a correct manner of driving. The further turn into left lane 2c represents a prohibited wrong-way driving incident. A wrong-way driving incident may be presumed from a vehicle orientation of 90° in comparison to the original correct vehicle direction or orientation.

Figure 7:
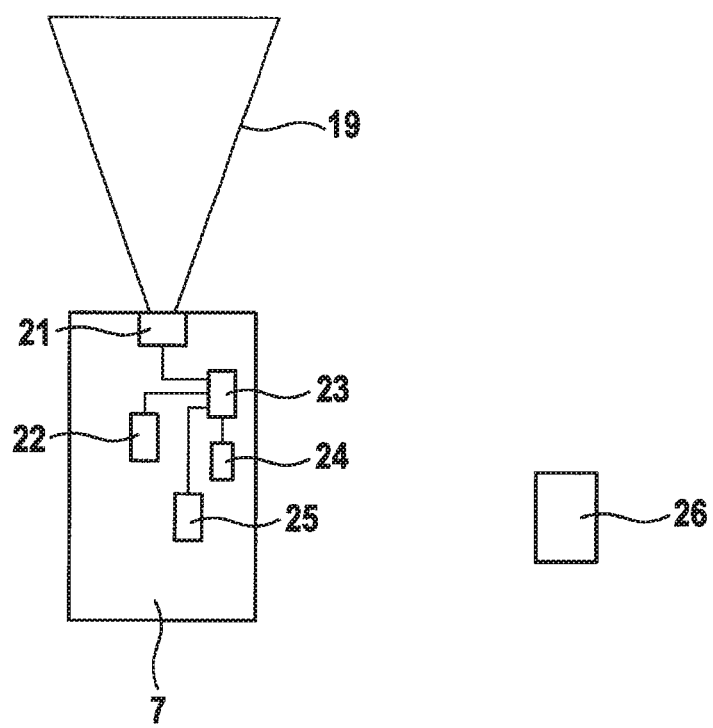
FIG. 7 shows a schematic view of a motor vehicle having a control and detection unit.

FIG. 7 schematically shows a motor vehicle 7, which corresponds to wrong-way driver 7 from the previous figures, for example. Motor vehicle 7 includes a control and detection unit having at least one sensor 21, which is shown here as an example of a plurality of sensors. Sensor 21 may be, for example, an image sensor such as a video camera, a radar sensor, an acceleration sensor, a wheel sensor, a steering angle sensor, a GPS device, or the like. Motor vehicle 7 or the control and detection unit furthermore includes a navigation device 22 and means for ascertaining a probability of a wrong-way driving incident, such as a controller or a control unit 23. Controller 23 is in communication with sensor 21 and navigation device 22, this may be by wire or wireless. The controller is also connected to a memory 24, which is used, for example, for storing data, such as comparison or plausibility check values, for the items of directional information. Furthermore, the controller is connected to a communication interface 25, which is configured to communicate with an external unit 26, such as a central server.

Sensor 21, navigation device 22, controller 23, memory 24, and communication interface 25 may be—as shown here—designed as independent units or they may be integrated into one or multiple units. In particular, it is not necessary for each component to be designed as hardware, individual functions may also be implemented as software routines or programs.

With the aid of communication interface 25, items of information, such as map data, and/or functionalities, such as an access to programs of external unit 26, may be provided to motor vehicle 7 and the control and detection unit.

Figure 8:
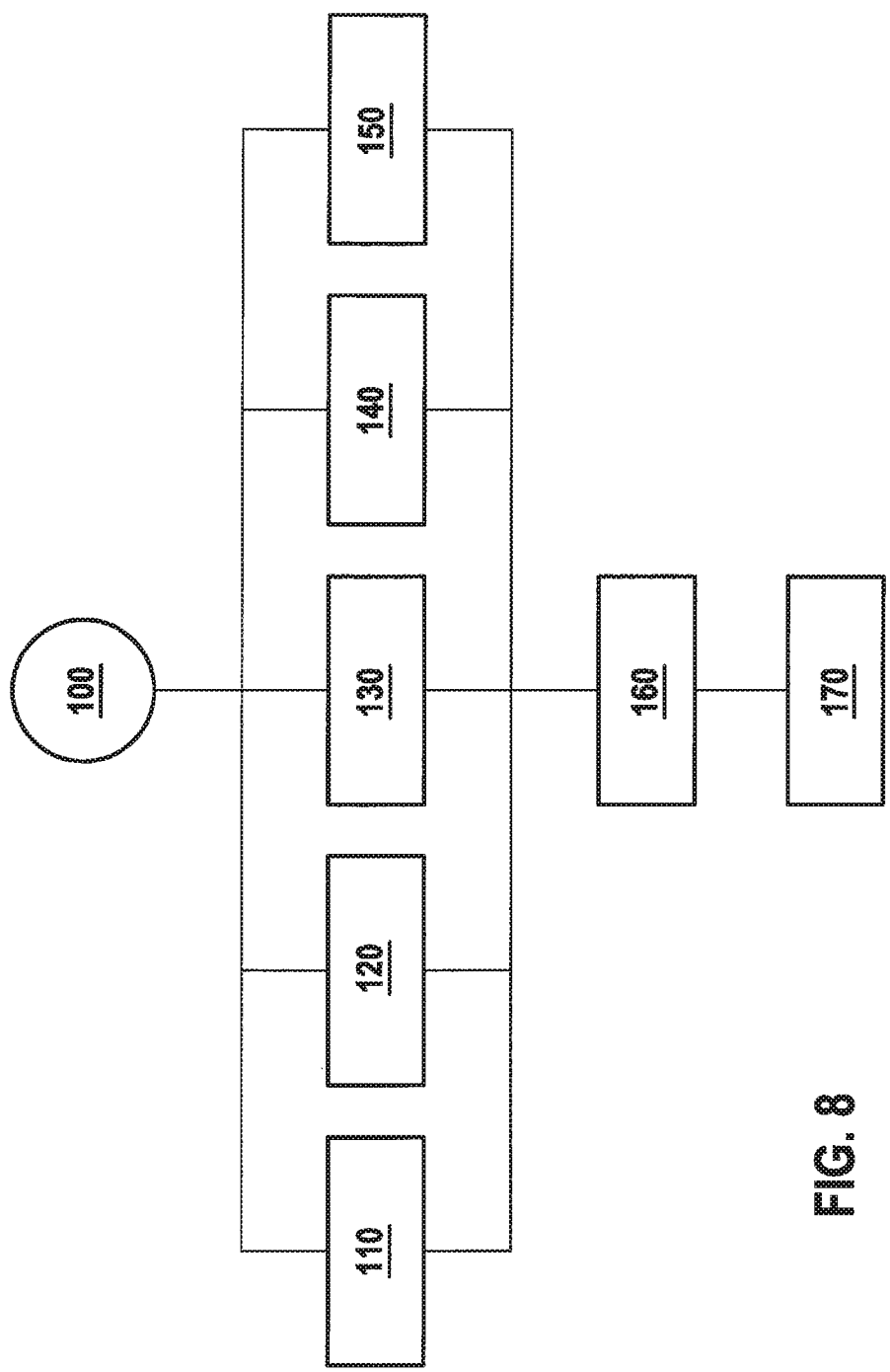
FIG. 8 shows a method, in the form of a flow chart, for checking the plausibility of a wrong-way driving incident of a motor vehicle.

A method for checking the plausibility of a wrong-way driving incident of a motor vehicle 7 will be described on the basis of FIG. 8 in synopsis with FIGS. 1 through 7.

In a first step 100 of the method, it is activated. This may take place, for example, in response to one or multiple sensors of motor vehicle 7 and/or external sensors.

Multiple detection steps 110 through 150 are described hereafter, which may run or be carried out chronologically in parallel and/or chronologically in succession. In a step 110, the traversing of a stop line 14 or a solid line 15 of junction 3 of unidirectional roadway 2 by motor vehicle 7 is detected. This detection may be based on video and/or navigation data. The situation of this detection is shown in FIG. 2. The traversing of stop line 14 or solid line 15 may be detected either directly via a camera recording of these lines or indirectly via a drive past one or multiple no-entry signs 16 and/or direction sign 17.

In a further step 120, direction-dependent roadway markings 18 are detected, which are recognized by sensor 21 of motor vehicle 7. The detection of this roadway marking or roadway markings 18 is a further plausibility check step. As described, this step may be based on video data and may additionally be supported or further checked for plausibility by navigation data. The situation of detection step 120 is shown in FIG. 3.

In a further step 130, at least one direction-dependent traffic sign 20 is detected by video sensor system 21 of motor vehicle 7, as shown in FIG. 4. This detection or recognition is also used for the further plausibility check of a wrong-way driving incident of motor vehicle 7.

In a further plausibility check step 140, turning from roadway 5 of junction 3 onto unidirectional roadway 2 is detected. This turn or this entry of motor vehicle 7 is shown in FIG. 5. This detection may be carried out with the aid of video sensor system 21, an inertial sensor system, and/or navigation module 22 of motor vehicle 7.

In a further detection or plausibility check step 150, it is detected whether an initiation and/or a procedure of a turning maneuver is detected during the drive on unidirectional roadway 2. This situation is shown in FIG. 6. Step 150 itself may include, for example, three individual plausibility check steps, of which the first is the determination of a drive on a unidirectional roadway 2, for example, an expressway. This is possible via video sensor system 21 and/or a navigation system 22. Secondly, the initiation of a turning maneuver may be determined via the inertial sensor system of motor vehicle 7. Finally, the procedure of the turning maneuver may be established, for example, via a slow speed, a large steering angle, and the yaw rate. Based on the last two steps, an initiation and/or a procedure of a turning maneuver may also be detected on other roads or roadways such as junction 3.

In a further step 160, a probability of a wrong-way driving incident is ascertained, and namely based on at least one of detection steps 110, 120, 130, 140, or 150. The processing or calculation of sensor data possibly to be carried out for this purpose may take place either in motor vehicle 7, for example, in controller 23, or in an external unit 26.

In general, the method for checking the plausibility of a wrong-way driving incident may be considered in such a way that for each detection or plausibility check step 110, 120, 130, 140, and 150, a different plausibility check criterion is considered. For each of these plausibility check criteria, for example, the detection of a traversing of a stop line, initially a measured or sensor value is collected. For example, in the case of a traversing of a stop line, this may be a camera image containing stop line 14 or already processed or preprocessed sensor data, for example, the dimensions and/or the orientation of a line on a roadway. Subsequently, this measured value is compared to a predefined plausibility check value, which may be stored, for example, in memory 24 of motor vehicle 7 or in external unit 26. In the case of a stop line 14, this plausibility check value may include, for example, the dimensions and/or the spatial arrangement of a stop line.

Each plausibility check criterion may be evaluated based on this comparison. This may take place solely digitally, i.e., if a plausibility or plausibility check criterion is met or violated, it assumes value 1, while it otherwise has value 0. Alternatively, it may be provided that this evaluation is carried out by percentage, for example, as a function of the reliability and/or the significance of the sensor data.

Furthermore, each plausibility check criterion or each detection step 110 through 150 may be associated with a percentage or a probability. Thus, for example, a percentage value of 20% may be associated with each step 110 through 150. It is also possible that individual steps 110 through 150 are associated with different percentage values or percentages. Thus, for example, plausibility criteria arranged successively in an event chain may be provided with a higher percentage with increasing progress in the event chain. Such an event chain may be the detection of a traversing of a stop line, then the detection of direction-dependent roadway markings, and subsequently the detection of direction-dependent traffic signs. For example, the first step may then be weighted with or subject to 10%, the second step with 20%, and the third step with 30%.

Based on the various percentages or percentage values, the probability of a wrong-way driving incident is now ascertained. This may be carried out, for example, in that the percentages are added up for all met plausibility check criteria, whereby the probability of a wrong-way driving incident results directly. Thus, for example, with a percentage of 20% each, a probability of a wrong-way driving incident of 60% results with three met plausibility check criteria.

In a further step 170, a wrong-way driving incident may be determined or detected based on the probability. For this purpose, the ascertained probability may be compared to a predefined, also adaptable, limiting value. For example, this limiting value may be 60%, so that a wrong-way driving incident is detected from or at a probability of 60%. Responses to the detection may subsequently take place in step 170 or in a further step. These may include passive actions, such as warnings or warning messages to the driver of motor vehicle 7, and also active actions, for example, an intervention in the movement and/or steering of motor vehicle 7.

What is claimed is:

1. A method for checking a plausibility of a wrong-way driving of a motor vehicle at least when entering a unidirectional roadway, comprising:
    detecting, as a first plausibility check criterion to which a first predetermined percentage value is assigned, a traversing of one of a stop line or a solid line of a junction of the unidirectional roadway;
    collecting, as a second plausibility check criterion to which a second predetermined percentage value is assigned, at least one item of directional information of a roadway of the junction located ahead of the motor vehicle; and
    based on the first and second plausibility check criteria and their respectively assigned first and second predetermined percentage values, ascertaining a probability of a wrong-way driving based on the detected traversing and the at least one item of directional information.

2. The method as recited in claim 1, wherein the directional information includes at least one of a direction-dependent roadway marking and a direction-dependent traffic sign.

3. The method as recited in claim 2, further comprising:
    detecting turning from the roadway of the junction onto the unidirectional roadway.

4. The method as recited in claim 2, wherein the detection of the traversing takes place based on information from at least one of video data, navigation data, and data of an inertial sensor system of the motor vehicle.

5. The method as recited in claim 4, wherein at least one of the detection of the traversing and the ascertainment of the probability of a wrong-way driving is carried out in a processing unit external to the motor vehicle.

6. The method as recited in claim 2, further comprising:
    detecting, while driving on the unidirectional roadway, at least one of an initiation and a performing of a turning maneuver.

7. The method as recited in claim 2, wherein a wrong-way driving incident is determined based on a comparison of the ascertained probability to a predefined threshold value.

8. The method as recited in claim 2, wherein each of the predetermined percentage values is a respective probability of the wrong-way driving.

9. A control and detection unit for checking a plausibility of a wrong-way driving of a motor vehicle at least when entering a unidirectional roadway, comprising:
    a detection unit configured to:
        (i) detect, as a first plausibility check criterion to which a first predetermined percentage value is assigned, a traversing of one of a stop line or a solid line of a junction of the unidirectional roadway; and
        (ii) collect, as a second plausibility check criterion to which a second predetermined percentage value is assigned, at least one item of directional information of a roadway of the junction located ahead of the motor vehicle; and
    a controller including a processor configured to, based on the first and second plausibility check criteria and their respectively assigned first and second predetermined percentage values, ascertain a probability of a wrong-way driving based on the detected traversing and the at least one item of directional information.

10. The control and detection unit as recited in claim 9, wherein the detection unit includes at least one if an optical sensor, a navigation system, and an inertial sensor.

11. A method for checking a plausibility of a wrong-way driving of a motor vehicle at least when entering a unidirectional roadway, comprising:
    detecting a traversing of one of a stop line or a solid line of a junction of the unidirectional roadway;
    subsequent to the detecting, collecting at least one item of directional information of a roadway of the junction located ahead of the motor vehicle; and
    based on the detected traversing, the collected at least one item, and the sequence of the collecting of the at least one item occurring after the detecting of the traversing, ascertaining a probability of a wrong-way driving.

* * * * *